Figures 1, 2:
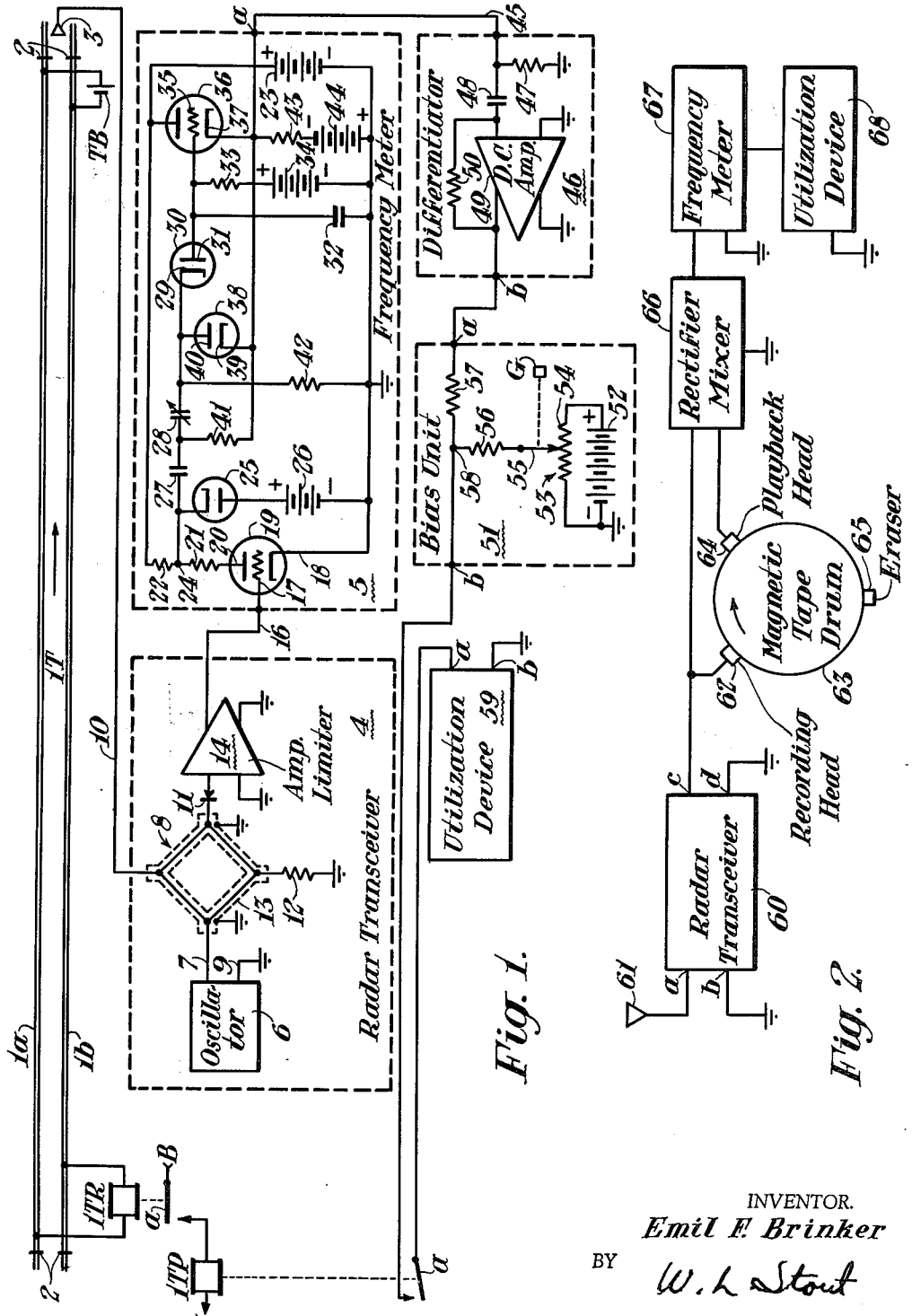

May 7, 1963

E. F. BRINKER 3,089,029

APPARATUS FOR MEASURING THE ROLLING RESISTANCE OF A CAR

Filed April 9, 1958

INVENTOR.
Emil F. Brinker
BY
W. L. Stout
HIS ATTORNEY

United States Patent Office 3,089,029
Patented May 7, 1963

3,089,029
APPARATUS FOR MEASURING THE ROLLING RESISTANCE OF A CAR
Emil F. Brinker, Blackridge, Pa., assignor to Westinghouse Air Brake Company, Wilmerding, Pa., a corporation of Pennsylvania
Filed Apr. 9, 1958, Ser. No. 727,388
4 Claims. (Cl. 246—182)

This invention relates to measuring apparatus, and in particular to an improved system for measuring the rolling resistance of a cut of one or more railway cars on a stretch of track.

The copending application of David P. Fitzsimmons and William A. Robison, Jr., Serial No. 676,730, filed August 7, 1957, for Automatic Control System for Railway Classification Yards, which is assigned to the assignee of the present application, discloses automatic control apparatus for railway classification yards in which the speed of cars rolling from a hump are controlled to suitable coupling velocities in the storage tracks of the yard. In such a system, it is necessary to measure the rolling resistance of each car in order to predict the behavior of the cars on the storage tracks.

As shown in the above-mentioned copending application, a typical classification yard comprises a plurality of routes over which cars may be directed to selected storage tracks, each route including one or more retarders and usually including curved portions as well as straight or tangent portions. In general, the storage tracks are tangent over most of their lengths, and it is not uncommon to have lengths of storage tracks past the final or group retarders which may be tangent for distances up to 6000 feet. In order to predict the coupling velocity of a car with preceding cars after rolling over lengths of track of this magnitude, so that the group retarders may be adjusted to provide corresponding leaving speeds, it is necessary that the rolling resistance of each car be known to a high degree of accuracy. In particular, the coupling speed $V_c$ of a car entering a stretch of track with an entering velocity $V_e$ may be found from the following equation:

$$V_c{}^2 = V_e{}^2 + 29.9 D_c \left( \frac{G_c}{100} - \frac{R_c}{2000} \right) + 29.9 D_t \left( \frac{G_t}{100} - \frac{R_t}{2000} \right)$$

where $V_c$ and $V_e$ are measured in miles per hour; $D_c$ and $D_t$ are the lengths of the curved and tangent portions, respectively, of the stretch, expressed in feet; $G_c$ and $G_t$ are the grades of the curved and tangent portions, respectively, expressed in percent; and $R_c$ and $R_t$ are the rolling resistances of the car on the curved and tangent tracks, respectively, expressed in pounds per ton. By a well-known method of approximating errors, it can readily be shown that the percentage of error in the coupling velocity $V_c$ due to errors in the tangent track rolling resistance alone is $$100 \frac{\Delta V_c}{V_c} = -29.9 \frac{D_t R_t}{40 V_c{}^2}$$

Since the error in $R_t$ is multiplied by the distance $D_t$, which may be up to 6000 feet, it can readily be seen that it is necessary to measure $R_t$ with great precision.

Former methods proposed for measuring the rolling resistance of cars have relied on measuring the acceleration of a car by timing the passage of the car over two stretches of track of known length. This method requires a rather considerable length of tangent track for the measuring section, which is not always available in classification yards. Moreover, the method is only accurate for constant positive or negative values of acceleration. However, it has been found that railway cars leaving a classification yard hump will in general exhibit an acceleration transient which may continue for some distance before the car settles down to an equilibrium value of acceleration. Accordingly, it is an object of my invention to provide a rolling resistance measuring system with which the last value of rolling resistance attained in a given measuring stretch can be determined regardless of the transient behavior of a car upon entering the stretch.

It is a further object of my invention to provide apparatus for measuring the acceleration of a moving body.

Other objects and further advantages of my invention will appear as the description proceeds.

In practicing my invention, in accordance with one embodiment thereof, I measure the acceleration of a body moving along a fixed path by means of a radar unit having a directional antenna located in the path of the moving body and an electronic differentiating unit which is controlled by the radar unit to produce an output voltage varying in accordance with the acceleration of the object. In accordance with a second embodiment of my invention, I record the output of the radar unit on a magnetic tape drum, and provide a play-back head on the drum separated by a predetermined distance from the recording head. The output of the radar unit and the play-back head on the recording unit are applied to a rectifying mixer which produces an output signal varying in accordance with the acceleration of the moving body.

Where it is desired to apply my invention to measure the rolling resistance of freight cars, for example, in a system of the type disclosed in the above-mentioned copending application, I locate the antenna of the radar unit in a selected track section of known characteristics which is provided with occupancy detection equipment. Circuits are provided for controlling the output of the acceleration measuring equipment of either embodiment of my invention in accordance with the occupied or unoccupied condition of the associated track section. Further, since the acceleration of a car on a known stretch of track depends, not only on the rolling resistance of the car, but on the grade of the track, I provide means for biasing the acceleration signal by an amount determined by the grade of the track to produce an output signal in accordance with the rolling resistance of the car.

I shall first describe two embodiments of my invention, and shall then point out the novel features thereof in claims.

The structure and operation of the two embodiments of my invention to be described will be best understood by a consideration of the drawings, in which FIG. 1 is a wiring diagram of one embodiment of my invention, and FIG. 2 is a wiring diagram of a second embodiment of my invention.

Referring now to FIG. 1, there is shown a track section 1T comprising rails 1a and 1b over which cuts of one or more cars are to move in the direction shown by the arrow. This track section may be located in advance of the master retarder in a yard constructed in accordance with the disclosure of the above-mentioned copending application, in which the corresponding track section would be section AT as shown in FIG. 18 of the copending application. Track section 1T is terminated by insulated joints 2 located at the ends thereof as shown, in a conventional manner well known in the art. This track section is provided with occupancy detection equipment, here shown as a conventional D.C. track circuit comprising a track battery TB connected across the rails at the exit end of the section and a track relay 1TR connected across the rails at the entrance end of the track section. If desired, a back contact repeater relay 1TP for track relay 1TR may be controlled over back contact $a$ of relay 1TR from terminals B and N of a conventional source of power such as a battery, not shown, such that repeater relay 1TP is picked up when section 1T is occupied and released when the section is unoccupied. However, as will be apparent to those skilled in the art, other forms of occupancy detectors, such as photocells, high frequency overlay circuits, mechanically operated track treadles, or the like, could be employed if so desired.

Located adjacent the exit end of track section 1T is an antenna 3 of a radar velocity measuring unit. This unit comprises a radar transceiver 4 and a frequency meter 5. Radar transceiver 4 may comprise a suitable oscillator 6, which may be of any conventional construction adapted to produce an output frequency in the radar range, having an output lead 7 connected to a "magic T" network 8 and an output lead 9 which is returned to a common potential indicated by the ground symbol as shown. "Magic T" network 8 is of a type well known in the art, and has a first junction connected to oscillator 6 over lead 7, a second junction connected over wave guide 10 to antenna 3, a third junction connected to a diode 11, to be described, and a fourth junction connected through a suitable resistor 12 to ground as shown. The legs of the "magic T" network are shielded by suitable means 13 which are grounded as shown.

In a manner well known in the art, energy from oscillator 6 fed to the "magic T" network is principally directed to antenna 3 over wave guide 10, but in the disclosed embodiment, the network is constructed to be slightly unbalanced so that a portion of this energy is also applied to diode 11. The energy fed to antenna 3 is radiated directionally, and a portion thereof may be reflected back to the antenna by an object in the path of the beam. Energy received in this manner by antenna 3 is directed back to the "magic T" network and causes a second voltage to be applied to diode 11. If a body in the path of the beam of antenna 3, such as a rolling car, is in motion, the energy reflected back to antenna 3 will have a frequency shifted from the radiated frequency by an amount proportional to the relative speed of the car with respect to the antenna in accordance with the well-known Doppler principle. Therefore, the signal applied to diode 11 will be composed of a first voltage of the frequency of oscillator 6 and a second voltage having a frequency determined by the speed of a body moving in the path of the antenna.

Diode 11, which may comprise a conventional crystal diode, acts as a mixer and combines the energies of the transmitted and received signals to develop a signal having a frequency component proportional to the difference of the frequencies of the transmitted and received waves.

The "beat frequency" signal supplied by diode 11 is applied to a conventional amplifier-limiter 14, where the voltage is raised to a selected level, and, due to the limiting action, the peaks of the waves are clipped to form a square wave.

The output of amplifier-limiter 14 is applied over lead 16 to a frequency meter 5, which, as shown, may be of the type disclosed and claimed in the copending application of Richard D. Campbell, Serial No. 582,248, now Patent No. 2,908,865, for Frequency Measuring Apparatus, filed May 2, 1956, and assigned to the assignee of the present application. As more fully pointed out in the copending application, the signal from amplifier-limiter 14 is applied between grid 17 and cathode 18 of a suitable vacuum tube 19. The anode 20 of this tube is connected through resistors 21 and 22 in series to the positive terminal of a suitable source of potential here shown as a battery 23. Cathode 18 of tube 19 and the negative terminal of battery 23 are connected to the common ground point as shown. The junction 24 of resistors 21 and 22 is connected to a clamping circuit comprising a diode 25 and a source of voltage such as a battery 26. The clamping circuit acts in conjunction with vacuum tube 19 to limit the excursions of the voltage at junction 24. That is these components provide an upper and lower limit between junction 24 and ground that can not be exceeded. The input signal to tube 19 is of sufficient magnitude to vary between these upper and lower limits during the successive cycles of the input signal.

During the positive half cycles of the signal to tube 19 the grid is driven positive with respect to the cathode. This causes the tube to conduct a relatively high current and causes the voltage across resistors 21 and 22 to increase and the voltage between junction 24 and ground to decrease. This voltage can only decrease until it drops slightly below that of battery 26. Any tendency by the voltage to drop further provides a forward bias on diode 25, which causes the diode to conduct. This restores the voltage on junction 24 to substantially the voltage of battery 26 and thereby establishes a lower limit that can not be exceeded.

During the negative half cycles of the input, the anode current of tube 19 is reduced to zero. This prevents any current from flowing through resistors 21 and 22 and the voltage between junction 24 and ground rises to the potential of battery 23. This establishes an upper limit for the voltage that can not be exceeded. It is thus seen that the excursions of the voltage between junction 24 and ground are confined to voltages between those of battery 26 and battery 23.

A pair of capacitors 27 and 28 are connected between junction 24 and cathode 29 of a first diode 30. The anode 31 of diode 30 is connected to ground through a parallel circuit comprising capacitor 32 in one branch and a resistor 33 in series with a source of potential such as a battery 34 in the second branch. Anode 31 is further connected to grid 35 of a vacuum tube 36. Cathode 37 of vacuum tube 36 is connected through a second diode 38 to the cathode 29 of the first diode 30. Cathode 39 of the second diode is connected to the cathode of tube 36, while the anode 40 is connected to the cathode 29 of the first diode 30. The resistor 41 is connected between cathode 39 of the second diode and the junction of capacitors 27 and 28. A resistor 42 is connected between cathode 29 of the first diode and ground.

Capacitor 27 and resistor 41 provide isolation between the direct current potential of junction 24 and the diode circuits. The advantages of this construction are pointed out in copending application Serial No. 582,248, referred to above.

Resistor 42 controls the charge on capacitor 28 in such manner that the output indication varies linearly with the output frequency. The charge, and in turn, the voltage on capacitor 32 is controlled by the measured frequency in the following manner. When no signal, or a signal of zero frequency, is applied to the frequency measuring circuit, the voltage across capacitor 32 is substantially equal to the voltage between cathode 37 of tube 36 and ground. This is brought about by the action of diodes 30 and 38. That is, current flows from source 34 through resistor 33, diodes 30 and 38, resistor 43, source 44, and back to the source 34 until the voltage between the grid 35 of tube 36 and ground is substantially equal to the voltage between cathode 37 and ground. This reduces the voltage across the diodes to substantially zero. Hence, no further current flows through the diodes and capacitor 32 is provided with a voltage equal to the voltage between the cathode of tube 36 and ground.

The capacitor remains charged in this manner until an alternating signal is applied to the measuring circuit. The application of such a signal causes it to operate as follows. During each positive half cycle, when the potential of junction 24 decreases below its operating level, diode 30 is biased in the forward direction to provide current conduction which reduces the voltage across capacitor 32. During each subsequent half cycle, charging current from source 34 flows through resistor 33 to replenish the charge removed by the previous half cycle. However, before the charge is fully replenished, the following half cycle will cause an additional charge to be removed from the capacitor. This action continues until the decrease of the charge during the one half cycle of the measured frequency is substantially equal to the charge replenished by battery 24 and resistor 33 during each subsequent half cycle. Therefore, a unique voltage appears across the capacitor for each frequency to be measured.

The voltage that is representative of the measured frequency, and hence of the velocity of a car moving in the path of antenna 3, appears between output terminal $a$ of frequency meter 5 and ground. The voltage across capacitor 32 is coupled to the output terminal through a cathode follower amplifier comprising tube 36 and its associated circuitry. The cathode of this tube is connected to ground through resistor 43 in series with a voltage source 44. Voltage source 44 is connected so as to make the cathode negative with respect to ground. The anode of tube 36 is connected to the positive terminal of battery 23 and is thereby provided with a suitable operating voltage. The cathode follower amplifier means isolates the output circuit from capacitor 32 and thereby prevents the circuitry connected to the output terminals from loading the frequency measuring circuit.

The output of frequency meter 5 is supplied between lead 45 and ground to a differentiator 46 which may be of the type disclosed and claimed in copending application Serial No. 582,249, filed May 2, 1956, by Richard D. Campbell, for Differentiator, and assigned to the assignee of the present application. Basically, this circut comprises a differentiating network including a grounded resistor 47 and a capacitor 48, the capacitor being connected between terminal $a$ of frequency meter 5 and input terminal $a$ of D.C. amplifier 49 as shown. The D.C. amplifier may be of any conventional construction, although in a preferred embodiment of my invention it is of the form shown in copending application Serial No. 582,249, referred to above, and if desired, may be provided with feedback by means of a feedback resistor 50 as shown. The output of differentiator 46 appearing between terminal $b$ and ground will be proportional to the acceleration of cars moving in the path of antenna 3. This signal is supplied between terminal $a$ of a bias unit 51 and ground.

Bias unit 51 comprises a suitable source of D.C. voltage such as a battery 52, which may for example, have a voltage of 100 volts, and which is connected across a potentiometer 53, comprising a resistor 54 and a movable wiper 55, which may be manually adjusted to a value independent of the grade G in section 1T. The output voltage from potentiometer 53 is adjusted to a value of 100—G in one particular form of my invention, since in this form, which is adapted to be used in the system of the above-mentioned copending application of Fitzsimmons and Robison, it is desired to add a fixed bias of 100 volts for convenience of use in other circuits. However, if desired, the potentiometer 53 may be so adjusted and the voltage of battery 52 may be so selected as to provide a voltage output which is simply proportional to G. This voltage is applied to a summing network comprising resistors 56 and 57 connected to a common summing terminal 58. As pointed out in the above-mentioned copending application of Fitzsimmons and Robison, the rolling resistance R of a car in section 1T may be found from the equation $$R = G - a$$

where G is the grade of the section and $a$ is the acceleration of the car in the section. Therefore, the voltage appearing at summing terminal 58 and hence at output terminal $b$ of bias unit 51 will be $100-G+a=100-R$; or, following the alternative indicated above, the 100 volt bias could be omitted so that the output of the bias unit would be proportional to $G-a=R$.

The rolling resistance signal provided at output terminal $b$ of bias unit 51 may be applied to any desired form of utilization device 59 for control or indication purposes. For example, the equipment shown in the above-mentioned copending application of Fitzsimmons and Robison may be employed, and in this case the output appearing at terminal $b$ of bias unit 51 would be applied to input terminal $a$ of utilization device 59 over front contact $a$ of track repeater relay 1TP as shown.

In operation, the radar equipment of the apparatus of FIG. 1 may be considered to be normally energized. When a car enters track section 1T, causing relay 1TR to be released and relay 1TP to pick up, the output of bias unit 51 will be connected to utilization device 59 over front contact $a$ of relay 1TP. As the car moves along section 1T, it may have a positive, negative or zero value of acceleration which may change with time This value of acceleration will be measured by the output at terminal $b$ of differentiator 46 in the manner described above, and a corresponding biased output at terminal $b$ of bias unit 51 will reflect the instantaneous value of the rolling resistance with relatively little lag. Since the measurement of rolling resistance is continuing up until the time the car or cut of cars leaves section 1T, the car or cut has every opportunity to reach an equal equilibrium value of rolling resistance before it is necessary to interrupt the measurement and make it final. As applied in the system of the above-mentioned copending application, the output signal may be stored in suitable storage equipment which can stay on the line until the last moment, insuring that the rolling resistance is as close as possible to the equilibrium value.

FIG. 2 shows a second embodiment of an acceleration measuring device which can be used in place off the acceleration measuring circuit of FIG. 1. This apparatus comprises a radar transceiver 60 having input terminals $a$ and $b$ connected respectively to a suitable antenna 61 and to ground, and output terminals $c$ and $d$, of which terminal $d$ is connected to ground. Transceiver 60 may correspond in detail to radar transceiver 4 in FIG. 1, and will accordingly not be further described. The output signal appearing at terminal $c$ of transceiver 60 will comprise a signal of a frequency proportional to the velocity of an object moving toward the antenna 61. This signal is applied to a recording head 62 on a conventional magnetic recording drum 63 which is rotated in the direction of the arrow by conventional means, not shown, at a predetermined constant speed. A play-back head 64 is disposed on the drum a fixed distance from head 62 so that the recorded signal is played back a fixed time after it is applied. An eraser 65 is applied to the drum between heads 62 and 64 to remove the signal from the drum after it has been played back by head 64.

The outputs of play-back head 64 and radar transceiver 60 are applied to a rectifier-mixer 66, which may comprise a crystal diode or other conventional rectifier mixer known in the art. Since the output of the radar transceiver has a frequency proportional to the speed of a moving object at a given time, and the output of the play-back head has a frequency proportional to the speed of the object at a time a fixed amount prior to the given time, the output of the mixer will have a frequency component proportional to the change in frequency in a given time, which is obviously proportional to the average acceleration of the object over the time lag between recording and playback. Since this time lag can be made quite small, the acceleration of the object can obviously be measured with considerable speed. The output of rectifier-mixer 66 can be applied to a frequency meter 67 which may correspond to frequency meter 5, to develop a voltage having an amplitude proportional to the acceleration of a body moving in the path of antenna 61. This voltage may then be applied to any suitable utilization device 68, which, when the apparatus is used in a system of the type described in the above-mentioned copending application of Fitzsimmons and Robison, would correspond to utilization device 59 and bias unit 51 of FIG. 1, in an arrangement fully described in the copending application.

While I have described only two embodiments of my invention in detail, it will be apparent to those skilled in the art after reading my description that many changes and modifications can be made within the scope of my invention. Accordingly, I do not wish to be limited to the details shown, but only by the scope of the following claims.

Having thus described my invention, what I claim is:

1. Means for measuring the acceleration of a moving body, comprising, in combination, radar means for obtaining a first signal from the body having a frequency proportional to the velocity of the body at a first instant, means for recording said first signal, means operatively connected to said recording means for obtaining a reproduced first signal at a second instant a predetermined time interval after the first instant, said radar means also supplying a second signal at said second instant, and means for comparing the frequencies of the second signal and the reproduced first signal to provide a measurement of acceleration.

2. Means for measuring the acceleration of a moving body, comprising, in combination, radar means having an antenna directed toward the moving body and producing a first signal having a frequency proportional to the velocity of the body, means for recording an applied signal, means operatively connected to said recording means for reproducing the recorded signal a predetermined time after recording, means for comparing the frequencies of two applied signals to provide an output signal in accordance with the difference in frequency therebetween, means for applying said first signal to said recording means and said comparing means, and means for applying said reproduced signal to said comparing means, whereby said output signal represents the measure of acceleration of the moving body.

3. Means for generating an acceleration signal, comprising, in combination, a radar transceiver for obtaining a signal from a moving body in accordance with the velocity of the moving body, means for recording said signal, means controlled by said recording means for regenerating the signal recorded by said recording means a predetermined time interval after recording, signal comparing means, and means for applying said radar signal and said regenerated signal to said comparing means to generate an acceleration signal in accordance with the difference therebetween.

4. Apparatus for measuring the rolling resistance of a car rolling on a stretch of track of known slope, comprising, in combination, radar means having an antenna located on said stretch for sending a radar beam toward the car and receiving a first signal from the car in accordance with the velocity of the car at a first instant, means for recording said first signal, means operatively connected to said recording means for obtaining a reproduced first signal at a second instant a predetermined time interval after the first instant, said radar means also supplying a second signal at said second instant, rectifier-mixer means controlled by said radar means and said recording means for producing a third signal in accordance with the time rate of change of said first signal, means for generating a fourth signal in accordance with the slope of said stretch, and means for combining said third and fourth signals to produce an output signal varying directly in accordance with the rolling resistance of the car for a utilization device.

References Cited in the file of this patent

UNITED STATES PATENTS

| | | |
|---|---|---|
| 2,491,542 | Woodyard | Dec. 20, 1949 |
| 2,566,189 | Gloess | Aug. 28, 1951 |
| 2,859,435 | Auer | Nov. 4, 1958 |
| 2,866,373 | Doyle | Dec. 30, 1958 |

FOREIGN PATENTS

| | | |
|---|---|---|
| 756,499 | Great Britain | Sept. 5, 1956 |